(12) United States Patent
Lofton

(10) Patent No.: US 7,240,717 B2
(45) Date of Patent: Jul. 10, 2007

(54) MULTIPLE IGNITION SOURCE EXOTHERMIC REACTION MOLD DEVICE

(75) Inventor: David Lewis Lofton, Tulsa, OK (US)

(73) Assignee: Continental Industries, Inc., Tulsa, OK (US)

( * ) Notice: Subject to any disclaimer, the term of this patent is extended or adjusted under 35 U.S.C. 154(b) by 59 days.

(21) Appl. No.: 11/164,306

(22) Filed: Nov. 17, 2005

(65) Prior Publication Data
US 2007/0107869 A1   May 17, 2007

(51) Int. Cl.
*B23K 23/00* (2006.01)
*B22D 19/04* (2006.01)
(52) U.S. Cl. .................... 164/54; 228/234.3; 249/86
(58) Field of Classification Search ............ 164/53, 164/54; 228/234.3; 249/86
See application file for complete search history.

(56) References Cited

U.S. PATENT DOCUMENTS

| | | | |
|---|---|---|---|
| 4,879,452 A | 11/1989 | Kovarik et al. ......... 219/130.4 |
| 4,885,452 A | 12/1989 | Amos et al. ............. 219/130.4 |
| 4,889,324 A | 12/1989 | Brosnan et al. ............. 266/157 |
| 5,011,067 A | 4/1991 | Foisy ......................... 228/241 |
| 5,145,106 A | 9/1992 | Moore et al. ............... 228/241 |
| 5,292,057 A | 3/1994 | Lomastro .................... 228/198 |
| 5,653,279 A | 8/1997 | Foutz et al. .................. 164/54 |
| 5,715,886 A | 2/1998 | Fuchs .......................... 164/54 |
| 5,829,510 A | 11/1998 | Fuchs .......................... 164/54 |
| 6,316,125 B1 | 11/2001 | Gaman et al. ............. 428/654 |
| 6,553,911 B1 | 4/2003 | Walker et al. .......... 102/202.7 |
| 6,703,578 B2 | 3/2004 | Walker et al. ......... 219/121.45 |
| 6,776,386 B1 | 8/2004 | Morrissey et al. ............ 249/97 |
| 6,994,244 B2 * | 2/2006 | Harger et al. ............ 228/234.3 |

\* cited by examiner

*Primary Examiner*—Kuang Y. Lin
(74) *Attorney, Agent, or Firm*—Head, Johnson & Kachigian

(57) ABSTRACT

A multiple ignition source exothermic reaction mold device. The mold device includes a crucible in a block with an open top for receiving exothermic reaction powder. A lid covering the open top has an opening therethrough. A receptacle in the lid is in communication with the opening so that the receptacle receives starting powder. The starting powder and, in turn, the exothermic weld material is ignited by alternate sources, either by a spark from an ignitor device or by an electric supply sent through an ignitor element.

10 Claims, 4 Drawing Sheets

MULTIPLE IGNITION SOURCE EXOTHERMIC REACTION MOLD DEVICE

BACKGROUND OF THE INVENTION

1. Field of the Invention

The present invention is directed to a multiple ignition source exothermic reaction mold device and method of use. In particular, the present invention is directed to an exothermic reaction mold device wherein alternate sources of ignition may be chosen and utilized.

2. Prior Art

The use of exothermic reaction welding is well known for joining connectors, such as stranded metal cable, to each other and also for joining ground rods and other metal parts.

A mold, which may be composed of graphite, ceramic or other refractory material, contains an internal crucible in which a powder material is placed. The bottom of the internal crucible forms a seat for a metal retainer disc which supports the exothermic powder material prior to ignition. When the exothermic powder material is ignited, an exothermic reaction results in the crucible. The powder liquefies and the molten material melts the small metal disc at the bottom of the crucible, thus permitting the molten metal to flow through a tap hole or passageway into a weld cavity. The mold itself is often used multiple times and is transported from location to location.

The exothermic reaction process is initiated and the welding is initiated by an ignition which may occur from various sources. A spark or ignition gun, sometimes referred to as a flint gun, is often used to start the exothermic reaction which takes place extremely quickly once ignited. One example of a mold ignited by a spark gun is shown in Assignee's U.S. Pat. No. 6,776,386. Alternatively, an electric ignition element having high resistance is used to start the exothermic weld reaction. The electrical ignition system is advantageous since it may be initiated from a greater distance away from the mold itself.

Examples of prior molds that incorporate electrical ignition include Brosnan et al. (U.S. Pat. No. 4,889,324) which discloses exothermic welding with an ignition system 64 having a pair of leads 66 to connect to an ignition fuser or hot wire. The ignition device 70 is placed a depth of ⅛ inch in the reaction material and comprises a core of aluminum wire having an outer alloy coating. Column 6, lines 62-65, indicates that "an example of an ignition fuse 70 suitable for use with the present invention is a wire sold under the trademark PYROFUZE by Pyrofuse Corp., an affiliate of Sigmund Cohn Corp. of Mount Vernon, N.Y."

Moore et al. (U.S. Pat. No. 5,145,106) discloses an ignitor with two lead wires with a high resistance bridge wire therebetween. The ignitor may be positioned above the material within the crucible of the mold. The shower of sparks or high temperature metal droplets are released from multiple points of ignition.

Walker et al. (U.S. Pat. Nos. 6,553,911 and 6,703,578) discloses an ignitor comprising two strips of metal foil separated by a layer of insulation. The ignitor includes one or more distortions in the form of punched holes. The voltage spike to the strips creates a spark plasma.

Kovarik et al. (U.S. Pat. No. 4,879,452) discloses an electrical ignition system for exothermic welding including an insulated wire pair 44 projecting into the exothermic material to be embedded therein.

Amos et al. (U.S. Pat. No. 4,885,452) discloses an exothermic reaction by creating a predetermined spark gap. In one embodiment, an insulated wire with a bare tip is placed below a surface of the reaction mixture. In another embodiment, spark gap may be established in a cartridge in a sidewall of the mold. In a further embodiment, the ignition may be sprayed on the top surface of the reaction mixture.

Gaman et al. (U.S. Pat. No. 6,316,125) discloses in FIG. 2 an electrical ignitor which projects through a wall of the crucible. The ignitor is positioned near the top of the charge.

Since the exothermic reaction weld is oftentimes made in the field in all types of conditions, it is desirable to have a choice of sources. Additionally, the weld may be made in confined spaces, such as a trench, wherein the ground rod is being installed or wherein a cable is being joined.

If the electrical ignition tools are not present at the site, it would be desirable to have an alternate source to ignite the exothermic weld reaction. Alternatively, if the spark ignition materials are not available, it would be desirable to have an alternate source to initiate the exothermic reaction welding.

Accordingly, it is a principal object and purpose of the present invention to provide an alternate source exothermic reaction mold device.

It is also a principal object and purpose of the present invention to provide a method or process wherein the exothermic weld reaction may be performed in alternate procedures.

It is also an object and purpose of the present invention to provide a multiple injection source exothermic reaction mold device wherein the ignition system is at all times visible and accessible in each source.

It is a further object and purpose of the present invention to provide a multiple injection source exothermic reaction mold device wherein the alternate starting elements are a part of a lid for the mold device.

SUMMARY OF THE INVENTION

The present invention is directed to a multiple and alternate ignition source exothermic reaction mold device and a process or method of use. In one preferred embodiment, a first portion of the mold joins with a second portion so that a crucible is formed having an open top. Clamps retain the portions in position so that they move between a closed position and an open position. Various types of connectors may be made while employing the invention.

A mold cavity is provided to receive molten material which flows from the exothermic reaction taking place in the crucible through a passageway joining the crucible and the mold.

A lid covers the open top of the mold device and may be hinged thereto. The lid includes an upper or top face with a circular opening therethrough. The lid also includes a bottom or lower face with an elongated opening therethrough. The circular opening has an axis which passes through the elongated opening. The circular opening includes a receptacle recessed into the lid for receiving a portion of starting powder.

A spark is caused to ignite the starting powder so that a spark or sparks will drop from the receptacle in the lid, through the lid, and into the crucible. Exothermic reaction material, such as metal oxide, will be reduced to form a liquid. The starting powder may be ignited in alternate ways. A mechanically generated spark can ignite the starting powder. An ignition gun may be used to create a spark which causes the starting powder to ignite. Alternately, an ignitor element is suspended above the lid and, in particular, suspended above the starting powder in the receptacle of the lid. A pair of threaded fasteners are each received in the lid with a threaded end extending from the lid. A wing nut or other mechanism is used to clamp down and hold the ends of the ignition element suspended above the lid. The ignition element is, in turn, wired to an electrical source, such as a battery.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
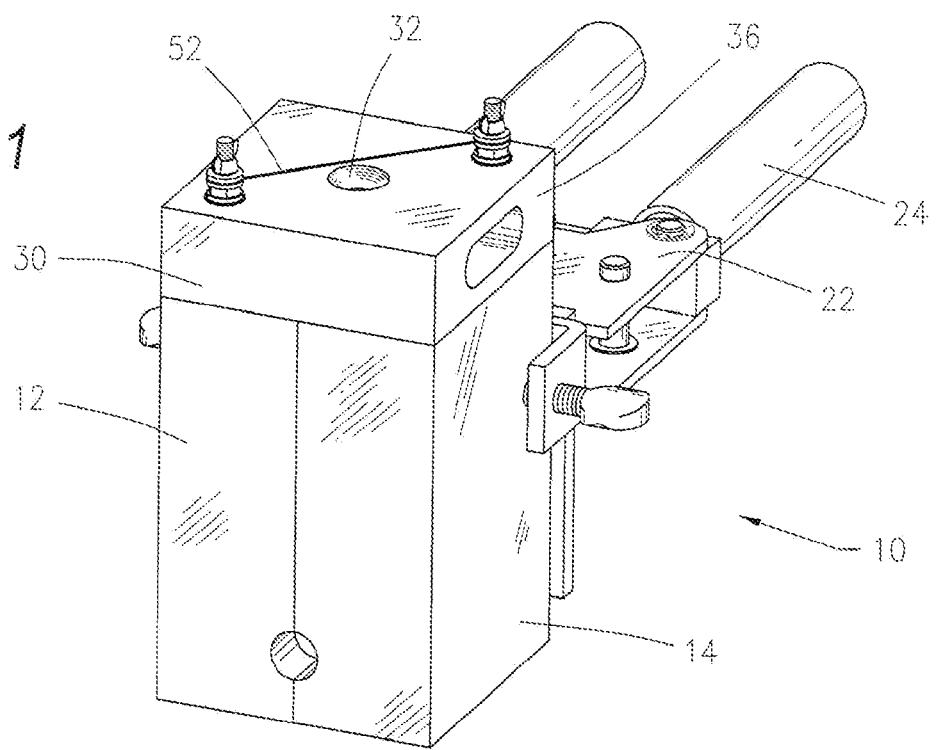
FIG. 1 illustrates a perspective view of a multiple ignition source exothermic reaction mold device constructed in accordance with the present invention which is shown in assembled and closed position.
Figure 2:
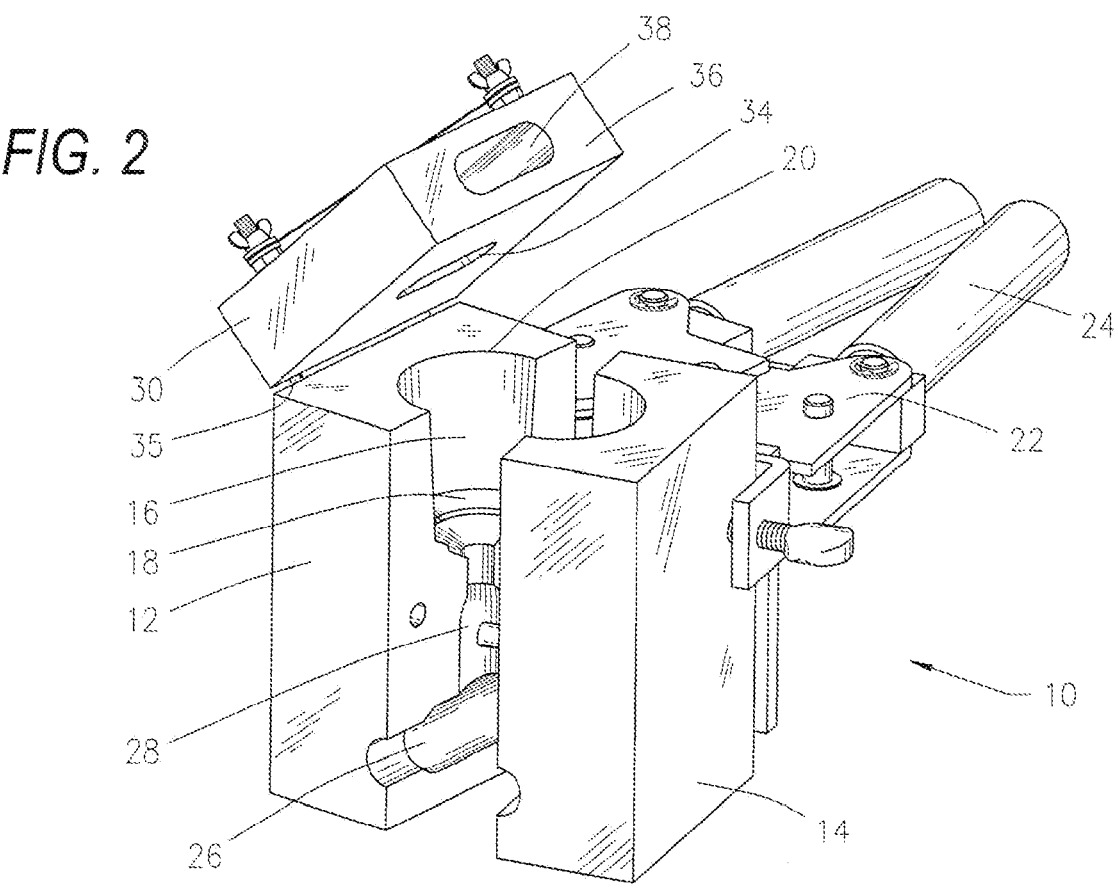
FIG. 2 illustrates the device shown in FIG. 1 wherein the component parts are separated.

FIG. 1 illustrates a perspective view of a multiple ignition source exothermic reaction mold device in assembled condition while FIG. 2 illustrates the device 10 wherein the component parts are separated.

One type of exothermic reaction mold device 10 is illustrated although it will be understood that a wide variety of devices may be employed within the teachings of the present invention. A first portion 12 of the mold device 10 joins with a second portion 14 of the mold 10. When the portions are joined together as shown in FIG. 1, a crucible 16 is formed having an open top 20. The base of the crucible 16 has a shoulder 18 to receive a small metal disk.

Clamps 22 retain the mold portions 12 and 14 in position so that they may move between the closed position shown in FIG. 1 and the open position shown in FIG. 2. Handles 24 may be utilized to move the clamps 22. A cable or cables (not shown) would be placed through a mold cavity 26. Various types of connectors, such as stranded cable to stranded cable, may be made while employing the present invention. The mold cavity 26 will receive molten material which flows from the exothermic reaction taking place in the crucible through a passageway 28.

Figure 6:
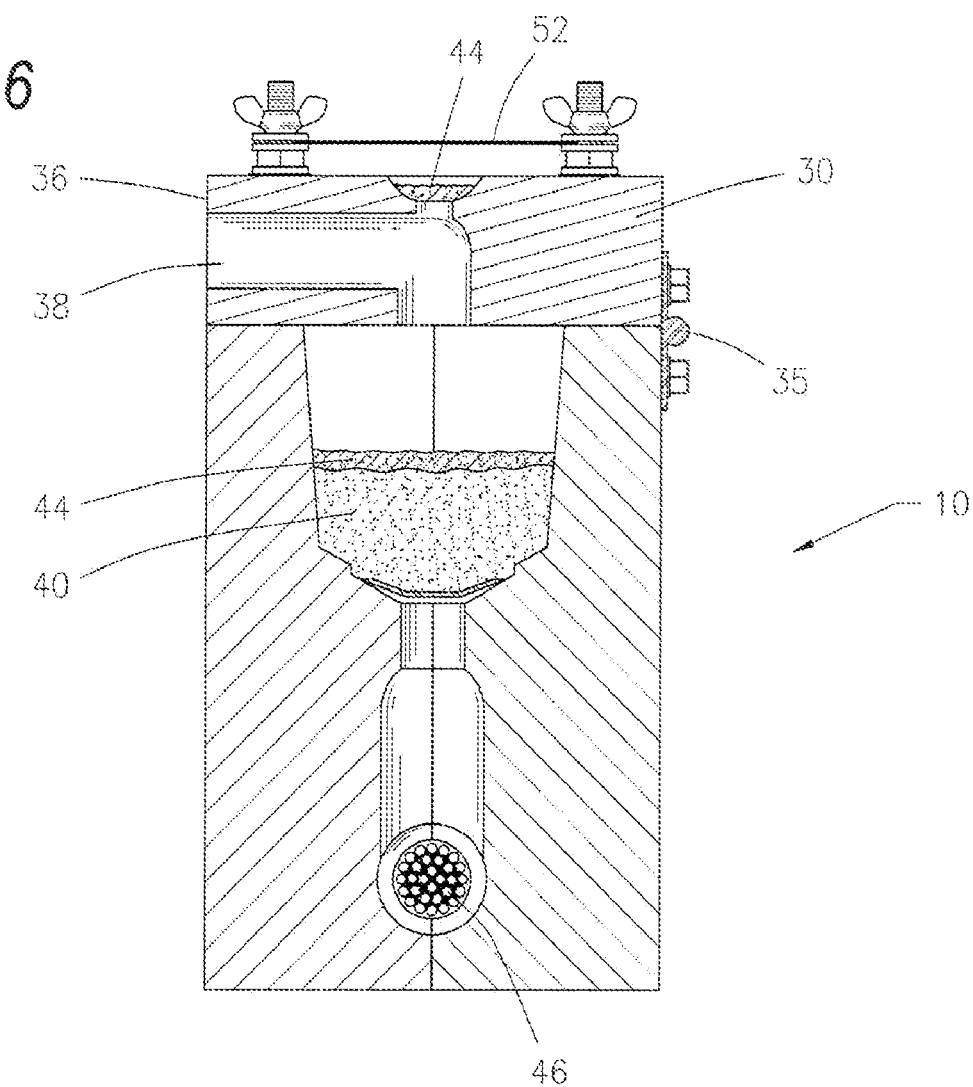
FIG. 6 illustrates a sectional view taken through section line 6-6 of FIG. 3.
Figure 7:
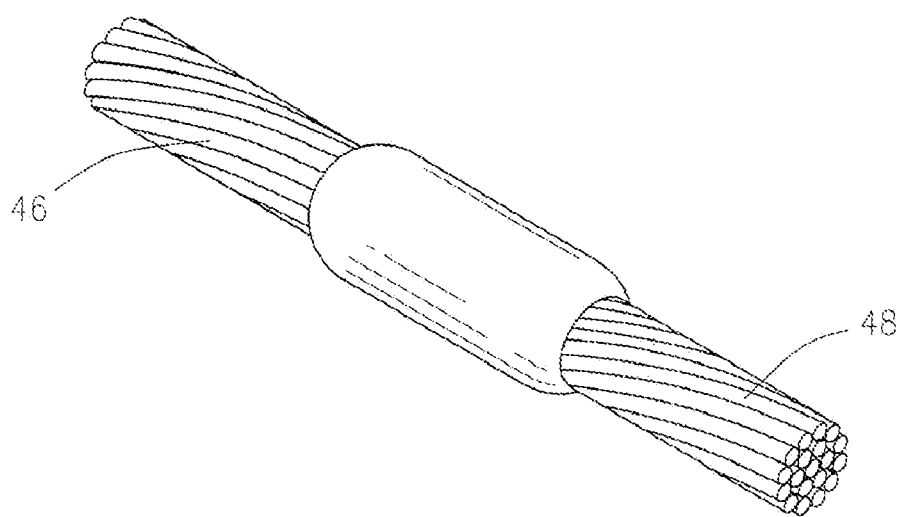
FIG. 7 illustrates a completed weld performed by the device of the present invention.

A lid 30 covers the open top 20 of the mold device 10. The lid 30 may be connected by a hinge or hinges 35 to the device. The lid 30 includes an upper or top face with a circular opening 32 through the lid. The lid also includes a bottom or lower face with an elongated opening 34 therethrough. The circular opening 32 has an axis perpendicular to the top and bottom faces which passes through the elongated opening 34. Between the top face and the lower face of the lid 30 are a series of side faces including side face 36. With reference to the sectional view shown in FIG. 6 and continuing reference to FIGS. 1 and 2, a space between the upper face and the lower face of the lid 30 forms a pocket which is in communication with both the circular opening 32 of the top face and the elongated opening 34 of the bottom face. The space 38 is vented through a vent and forms a pocket which is recessed from the side face 36 of the lid.

Figure 3:
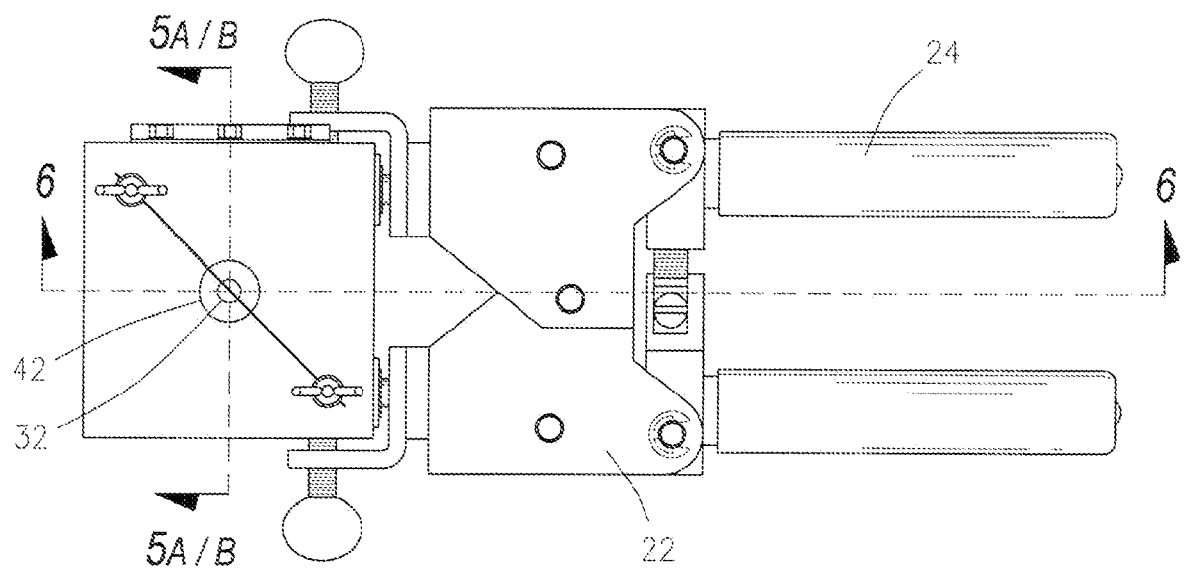
FIG. 3 illustrates a top view and FIG. 4 illustrates a side view of the mold device shown in FIG. 1.
Figure 4:
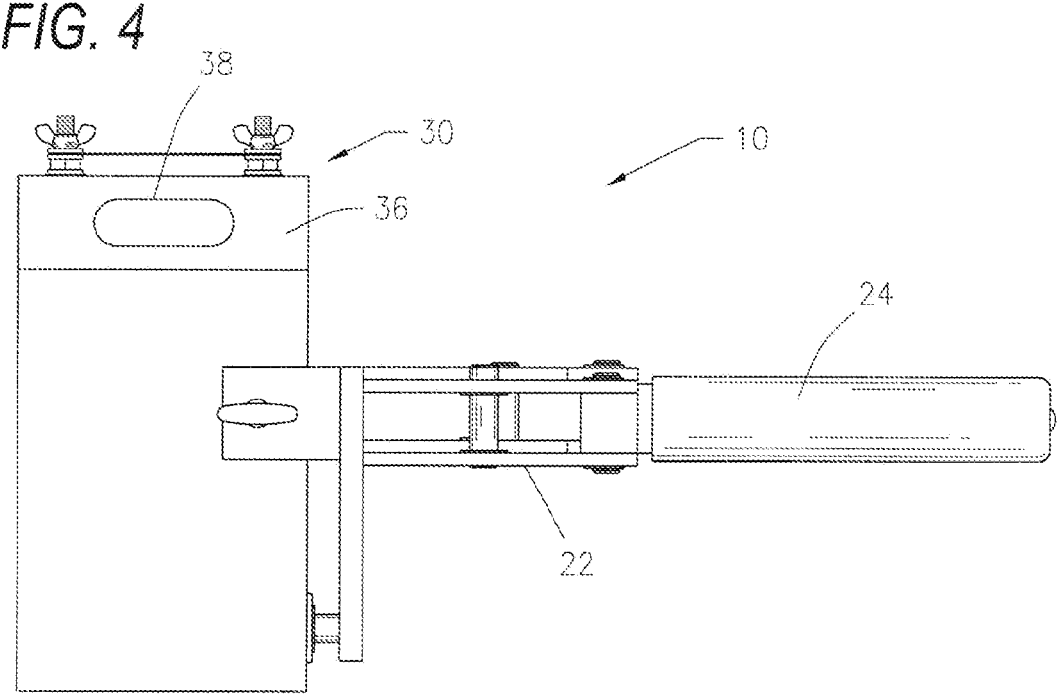

FIG. 3 illustrates a top view and FIG. 4 illustrates a side view of the mold device 10. The circular opening 32 includes a receptacle 42 which is recessed into the lid 30 for receiving a portion of starting powder 44. The receptacle 40 in the present embodiment is a counter-sunk funnel recessed into the top of the lid.

The first and second portions 12 and 14 as well as the lid 30 of the mold device 10 are composed of graphite.

Figure 5A:
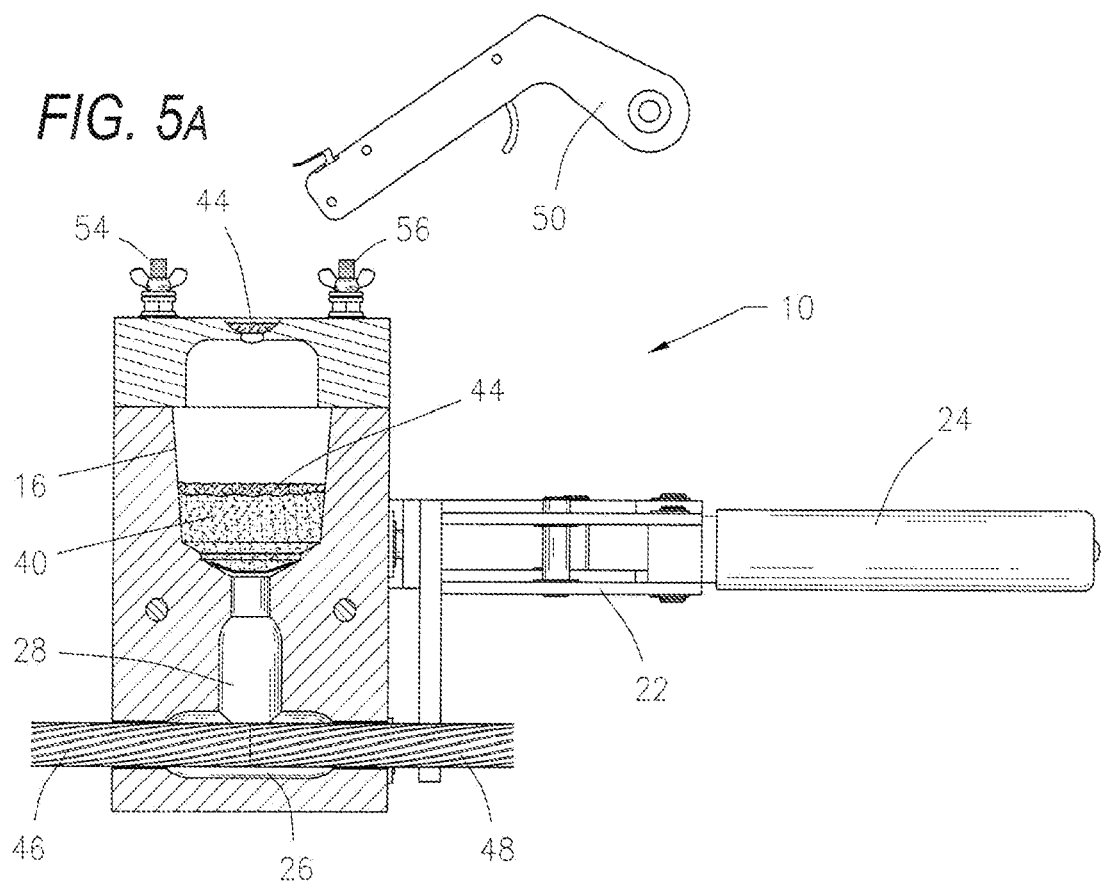
FIG. 5A and FIG. B are alternate sectional views taken through section line 5-5 of FIG. 3.
Figure 5B:
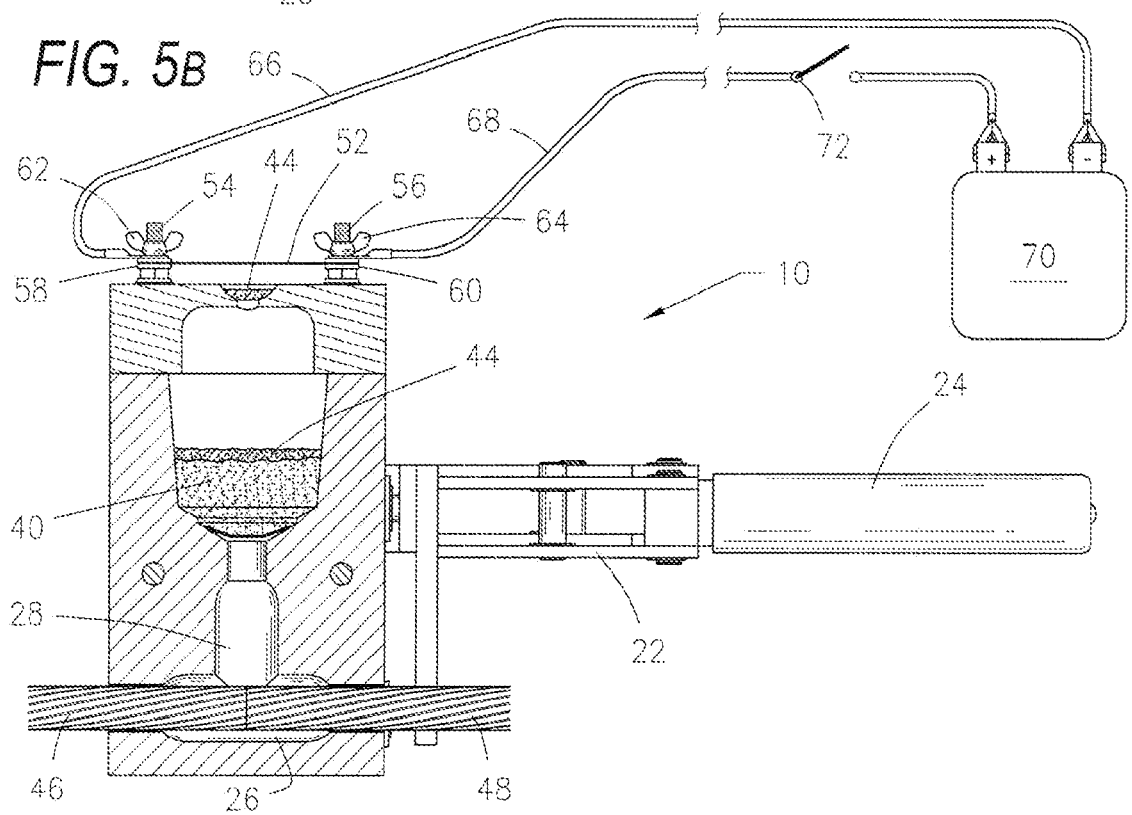

FIG. 5A and FIG. 5B show sectional views illustrating alternate mechanisms to ignite and initiate the exothermic mold reaction. Initially, the pair of cables 46 and 48 are positioned in the mold cavity 26 and a metal disk is placed in the base of the crucible. Thereafter, metal oxide 40 or other exothermic weld material 40 is inserted into the crucible. Once a portion of starting powder 44 is sprinkled on top of the metal oxide reaction material 40, and the lid is closed, a further portion of starting powder is placed in the receptacle 42 in the lid.

As best seen in FIG. 5A, a spark is caused to ignite the starting powder so that a spark or sparks will drop from the receptacle in the lid, through the lid, into the crucible. A spark may be initiated alternately by mechanical means or by electrical means.

As best seen in FIG. 5A, a spark may be mechanically generated by use of an ignition gun 50 brought near the starting powder.

An alternate mechanism to ignite the exothermic weld material is shown in FIG. 5B. An ignitor element 52 is suspended above the lid 30 and, in particular, suspended above the starting powder 44 in the receptacle 42 in the lid.

A pair of threaded fasteners 54 and 56 are each received in the lid 30 with a threaded end extending from the lid. Each fastener 54 and 56 may include a washer or washers 58 and 60, respectively, to clamp down and hold the ends of the ignition element 52. The ignition element itself may be a high resistance metal wire and coated with an ignition material. A wing nut 62 and 64 is threaded onto the threaded ends to hold down the washers 58 and 60 and the ignition element 52.

The threaded fasteners are, in turn, in communication via wires 66 and 68 to an electrical source such as a battery 70. A rechargeable battery might be provided or the electrical system of a vehicle might be used. An optional switch 72 may be provided. The electrical mechanism can be attached without tools.

In either case, the starting powder will initially be ignited which will cause the starting material 44 in the crucible to be ignited. In turn, this will cause the metal oxide 40 in the crucible to be reduced. The space 38 in the lid forms a vent for hot, escaping gases. As the metal oxide turns into molten liquid material, the metal disk will be melted, causing the molten material to flow through the passageway 28 into the mold cavity 26 forming a good electrical connector between the stranded cables 46 and 48.

It will be appreciated that the ignition mechanism is outside of the mold and at all times visible and accessible.

Whereas, the present invention has been described in relation to the drawings attached hereto, it should be understood that other and further modifications, apart from those shown or suggested herein, may be made within the spirit and scope of this invention.

What is claimed is:

1. A multiple ignition source exothermic reaction mold device which comprises:
   a crucible in a block with an open top;
   a lid covering said open top wherein said lid has an opening therethrough;
   a receptacle in said lid in communication with said lid opening for receiving starting powder; and
   a fastening mechanism to suspend an ignition element above said starting powder receptacle in said lid, so that said starting powder in said lid may be ignited either by said ignition element or by a spark.

2. A multiple ignition exothermic reaction mold device as set forth in claim 1 wherein said block is composed of graphite.

3. A multiple ignition exothermic reaction mold device as set forth in claim 1 wherein said receptacle in said lid for starting powder is a counter-sunk funnel top.

4. A multiple ignition exothermic reaction mold device as set forth in claim 1 wherein said fastening mechanism includes a pair of threaded fasteners received in said lid, each said fastener having a wing nut in order to suspend said igniter element over said receptacle.

5. A multiple ignition exothermic reaction mold device as set forth in claim 1 wherein said fastening mechanism is connected to an electrical source.

6. A multiple ignition exothermic reaction mold device as set forth in claim 1 wherein said spark is supplied by a flint gun.

7. A multiple ignition source exothermic reaction mold device which comprises:
   a crucible in a block with an open top;
   a lid covering said open top wherein said lid has an opening therethrough;
   a receptacle in said lid in communication with said opening for receipt of starting powder; and
   means to ignite said starting powder within said receptacle with an ignitor element suspended above said receptacle in said lid; and
   in said lid to alternately ignite said starting powder within said receptacle with a spark.

8. A multiple ignition source exothermic reaction mold device as set forth in claim 7 wherein said means to ignite said starting powder with an ignitor element includes a fastening mechanism to suspend said igniter element above said starting powder receptacle.

9. A multiple ignition exothermic reaction mold device as set forth in claim 8 wherein said fastening element includes a pair of threaded fasteners received in said lid, each said fastener having a wing nut in order to suspend said ignitor element over said receptacle.

10. A method to utilize a multiple ignition source exothermic reaction mold device, which method comprises the steps of:
    placing exothermic weld material in a crucible in a block with an open top;
    covering the open top with a lid wherein the lid has an opening therethrough;
    placing starting powder in a receptacle in the lid wherein the receptacle is in communication with said lid opening;
    choosing an ignition source between an electrically activated ignition element or ignited by a spark, each said ignition source contained in said lid; and
    causing said starting powder to ignite by utilizing said chosen ignition source.

* * * * *